Jan. 10, 1928.  
D. A. URIE  
1,655,584  
RECEPTACLE FILLING MACHINE  
Filed Dec. 3, 1921  
6 Sheets-Sheet 2

Jan. 10, 1928.  
D. A. URIE  
1,655,584  
RECEPTACLE FILLING MACHINE  
Filed Dec. 3, 1921  
6 Sheets-Sheet 3

Witness  
Milton Lenoir

Inventor.  
David A. Urie,  
By George Heidman  
Attorney.

Jan. 10, 1928.

D. A. URIE 1,655,584

RECEPTACLE FILLING MACHINE

Filed Dec. 3, 1921

Inventor
David A. Urie,
George Heidman.
Attorney.

Witness
Milton Lenoir

Jan. 10, 1928.

D. A. URIE 1,655,584

RECEPTACLE FILLING MACHINE

Filed Dec. 3, 1921      6 Sheets-Sheet 6

Witness
Milton Lenoir

Inventor
David A. Urie,
By George Heidman
Attorney.

Patented Jan. 10, 1928.

1,655,584

UNITED STATES PATENT OFFICE.

DAVID A. URIE, OF CHICAGO, ILLINOIS.

RECEPTACLE-FILLING MACHINE.

Application filed December 3, 1921. Serial No. 519,702.

My invention relates to a machine more especially intended for filling bottles and the like with a fluid; the object of the invention being to provide a construction whereby a predetermined quantity will be discharged at each operation in exact keeping with the capacity of the receptacle or bottle; the invention contemplating a construction capable of adjustment to such a nicety that the amount discharged at each operation will be uniform and in exact keeping with the capacity of the receptacle so as to eliminate any possible loss of the material.

The invention contemplates a machine wherein the receptacles or bottles will be automatically fed into position to receive the fluid or contents; with the bottle or receptacle carrying mechanism as well as the discharging mechanism capable of adjustments to receptacles or bottles of varying dimensions within certain limitations.

Another object of my invention is to provide a machine of the class referred to especially adapted for liquids of lighter specific gravity than water and wherein the liquid controlling and discharging mechanism will be positive in its operation; with the liquid discharging mechanism as well as the bottle-carrying and feeding mechanism being operated by a single power-unit, operable at varying speeds, while the fluid controlling mechanism may be quickly regulated to discharge the desired quantity.

The above enumerated objects and advantages inherent in the construction will all be more fully comprehended from the following detailed description of the accompanying drawings, wherein:—

Figures 1, 2:
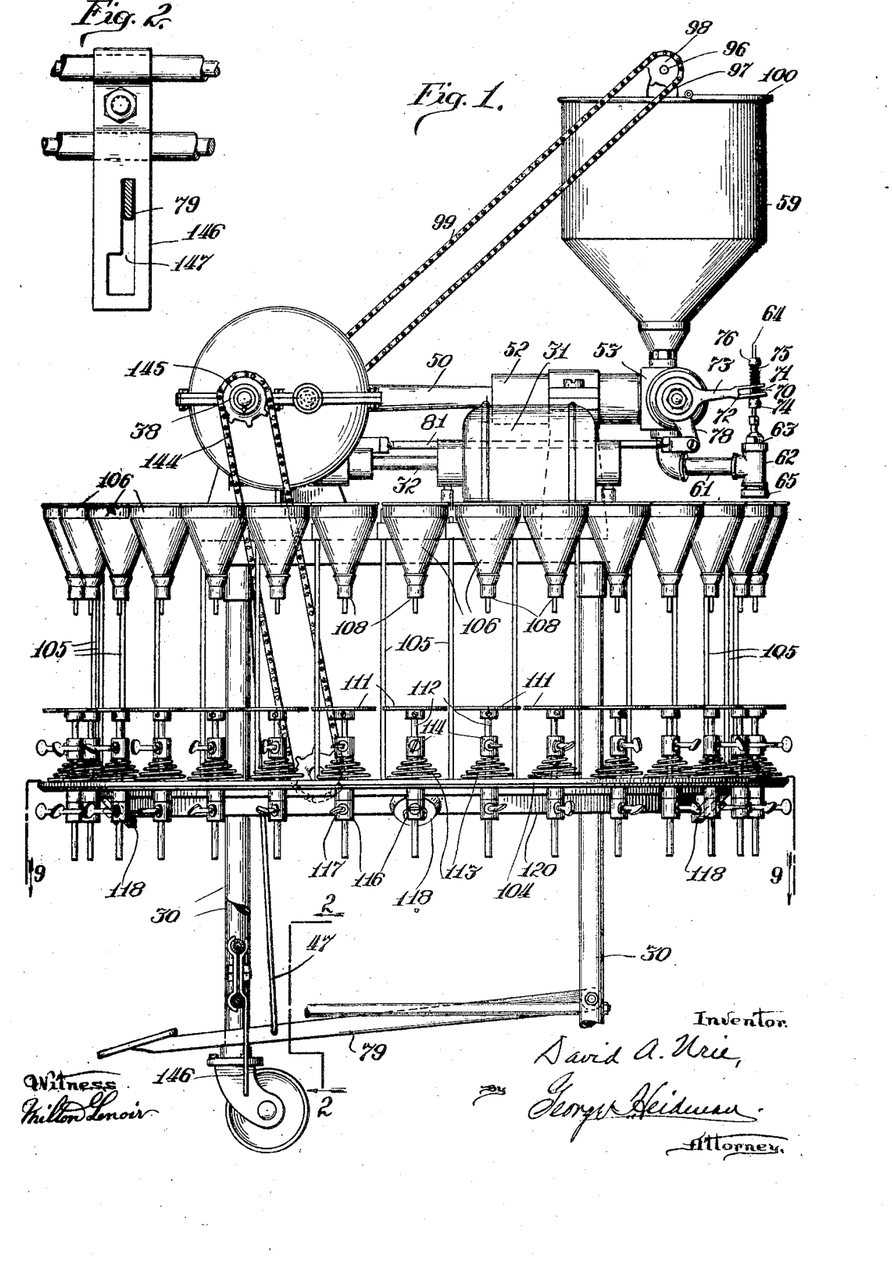
Figure 1 is a side elevation of my improved machine, with portions of the supporting standards broken away.
Figure 2 is a detail sectional view taken on the line 2—2 of Figure 1 looking in the direction of the arrows.
Figure 3:
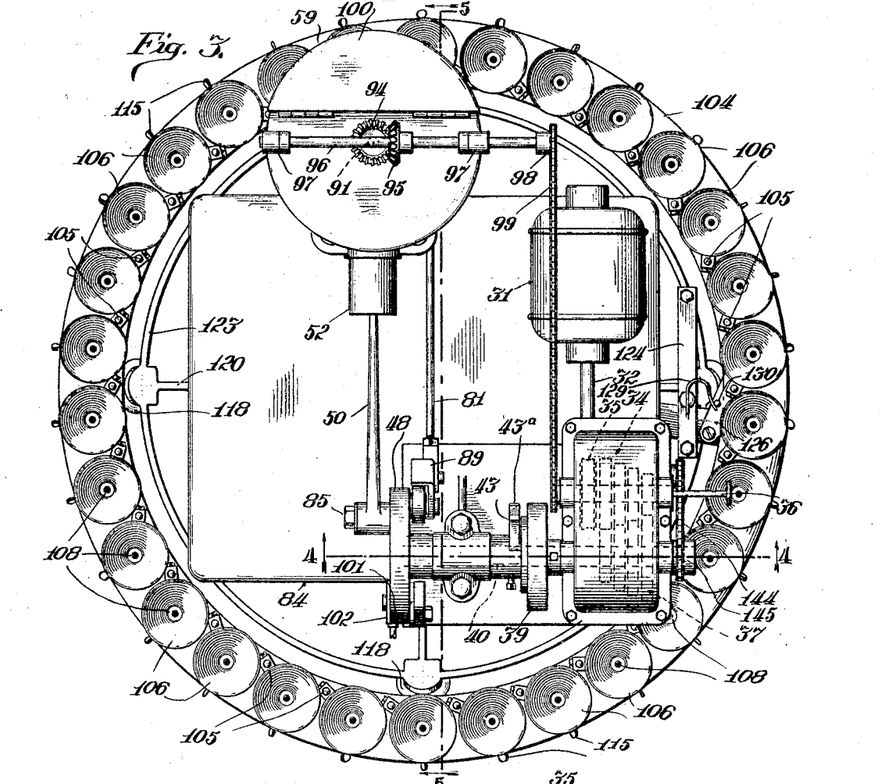
Figure 3 is a top plan view.
Figure 4:
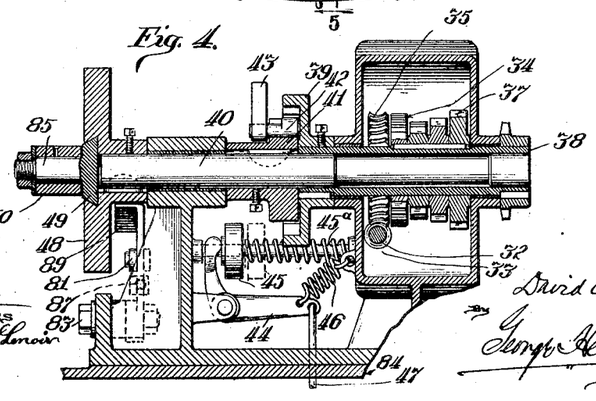
Figure 4 is a sectional view taken on the line 4—4 of Figure 3 looking in the direction of the arrows.

In the particular exemplification of the invention, as disclosed in the drawings, the machine comprises a frame having suitable standards or supporting legs 30, which may be provided with castors, as shown in Figure 1, to make the machine portable. The machine is preferably electrically driven and is therefore provided with an electric motor indicated at 31, the armature shaft 32 whereof is provided with a worm 33 adapted to drive suitable transmission or speed controlling mechanism consisting of the various gears indicated at 34, see Figures 3 and 4; with one set of said gears, namely the gears on the shaft provided with the worm gear 35 with which worm 33 meshes, being loosely mounted on the shaft and adapted to be placed into operative relation with said shaft by means of a slidable key 36.

The loosely mounted gears controlled by the slidable key 36 mesh with the gears 37 mounted on a sleeve 38; the gear controlled by the key 36 and the gears 37 being of different diameters to provide different speed ratios. The sleeve 38 is provided at one end with a flanged or internally toothed disc 39 and the sleeve and disc receive a shaft 40 on which is mounted a disc 41 keyed to shaft 40. The disc 41 is provided with a socket or cut-away portion in which a pawl 42 is oscillatably mounted; the pawl being provided with a trunnion having an extension or finger 43 secured thereto disposed parallel with the disc 41 and provided on its forward side, relative to direction of rotation, with a flat spring striker 43ª. The pawl 42 is arranged to be normally in mesh with the internal teeth of the disc 39 and thereby operatively connect the disc 41 to the disc 39, which will cause rotation of the disc 41 and therefore of shaft 40 when the sleeve 38 with disc 39 is rotated. Suitable mechanism, preferably shown as a bell-crank lever 44, is pivotally mounted on the frame of the machine adjacent to and slightly beneath shaft 40; the free end of the lever is bifurcated and slightly rounded on its forward face to engage the side of a spring controlled roller 45 which is slidably mounted on a stationary rod 45ª and normally held out of the path of the finger 43, and its spring plate 43ª; while oscillation of lever 44 will move roller 45 into the path of spring plate 43ª and finger 43, thereby causing oscillation of the pawl 42 in such direction as to force it out of engagement with the internal teeth of disc 39. The spring plate element 43ª is first engaged by the roller 45, and if the frictional engagement of pawl 42 with the internal teeth of disc 39 is too great, the spring plate 43ª bends backward into positive engagement with the finger 43, thereby forcing the pawl 42 out of engagement with the teeth of disc 39; the tension of spring element 43ª, after the frictional engagement of pawl 42 has been overcome, causing the pawl to be further oscillated to ensure clearance with the teeth of the disc. The bell-crank lever 44 is held in normal position through the action of the spring 46. The lever 44 is oscillated and the roller 45 moved into the path of the composite striker 43, 43ª by means of a link 47 connected with the bell-crank lever 44 and a foot treadle 79; downward movement of the foot treadle 79 causing the lever 44 to move roller 45 into the path of the striker so as to cause the action heretofore described. When treadle 79 is released, the lever 44 and roller 45 will immediately return to normal position, through the action of the two springs shown in Figure 4, which allows pawl 42 to return into engagement with the disc 39 with the result that shaft 40 will rotate with sleeve 38.

The outer end of shaft 40 is provided with a disc 48 secured thereto so as to rotate with the shaft and this disc is provided with a slot disposed transversely thereof, in which is dove-tailed a slidable block 49, which is adapted to be slid diametrically of the disc 48 so as to be moved to any desired point intermediate of the axis of the disc 48 and its periphery. The block 49 has one end of a piston-rod 50 secured thereto while the opposite end of the rod 50 is connected with a piston 51 slidably mounted in a cylinder 52 which in the present construction is preferably shown horizontally disposed. The closed end of the cylinder is provided with a valve-casing 53 in which is rotatably mounted a cylindrical or plug-valve 54, the periphery whereof, at predetermined points, is provided with the dished-out portions or recesses 55 and 56, see Figure 7. The valve-casing 53 is provided with a plurality of ports; the one port 57 whereof communicates with the cylinder 52; the second port 58 communicates with a fluid-holding receptacle 59, while the third port 60 communicates with a conduit 61.

Figure 7:
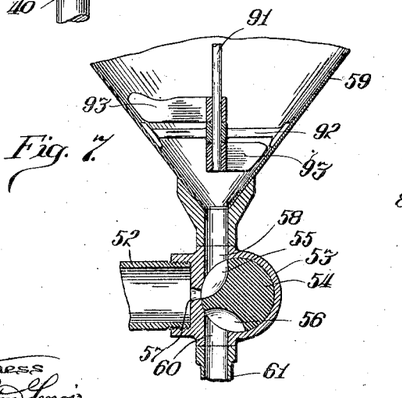
Figure 7 is a sectional view taken substantially on the off-set line 7—7 of Figure 6 with a portion of the fluid-holding receptacle broken away.
Figure 8:
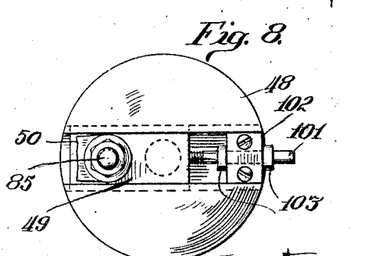
Figure 8 is a view taken substantially on the line 8—8 of Figure 6 looking in the direction of the arrows.

The dished-out portion 55 is of a size just sufficient to bring the port 57, which communicates with the cylinder 52, into communication with the port 58, which leads to the fluid-holding receptacle 59, when the valve is in one position, to-wit as illustrated in Figure 7; while the dished-out portion 56 in the valve 54 is of size just sufficient to permit the dished-out portion 56 to establish communication with port 57, leading from the cylinder 52, and with the port 60 leading to the conduit 61. The wall or bridge of the valve 54, intermediate of the dished-out portions 55 and 56, is of such width as to fully cover the port 57 when the valve 54 is rotated into a predetermined position in order that a complete shut off of port 57 may be had during the oscillatory movement of valve 54, accomplished by mechanism later to be described. The intermediate wall or bridge, at the same time, is of such size as to necessitate a very small movement of the valve to establish communication between the cylinder 52 and either the fluid-holding receptacle 59 or conduit 61, as the case may be.

Figure 5:
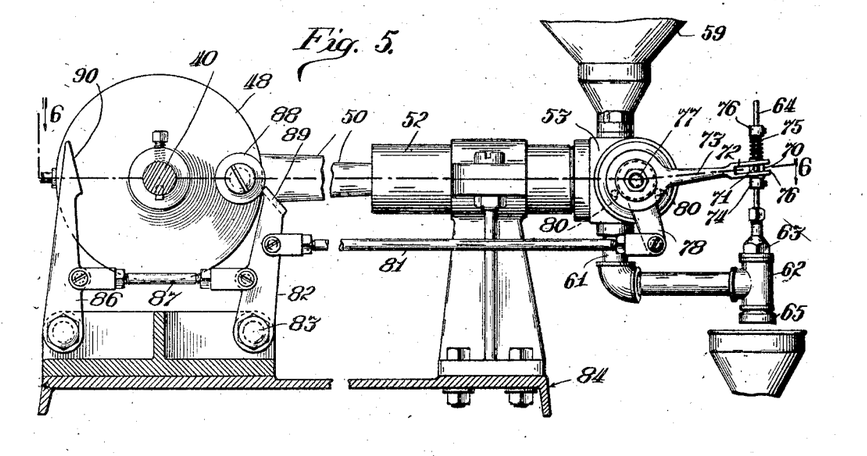
Figure 5 is a cross sectional view taken on the line 5—5 of Figure 3 looking in the direction of the arrows.
Figures 16, 17, 18, 19, 20:
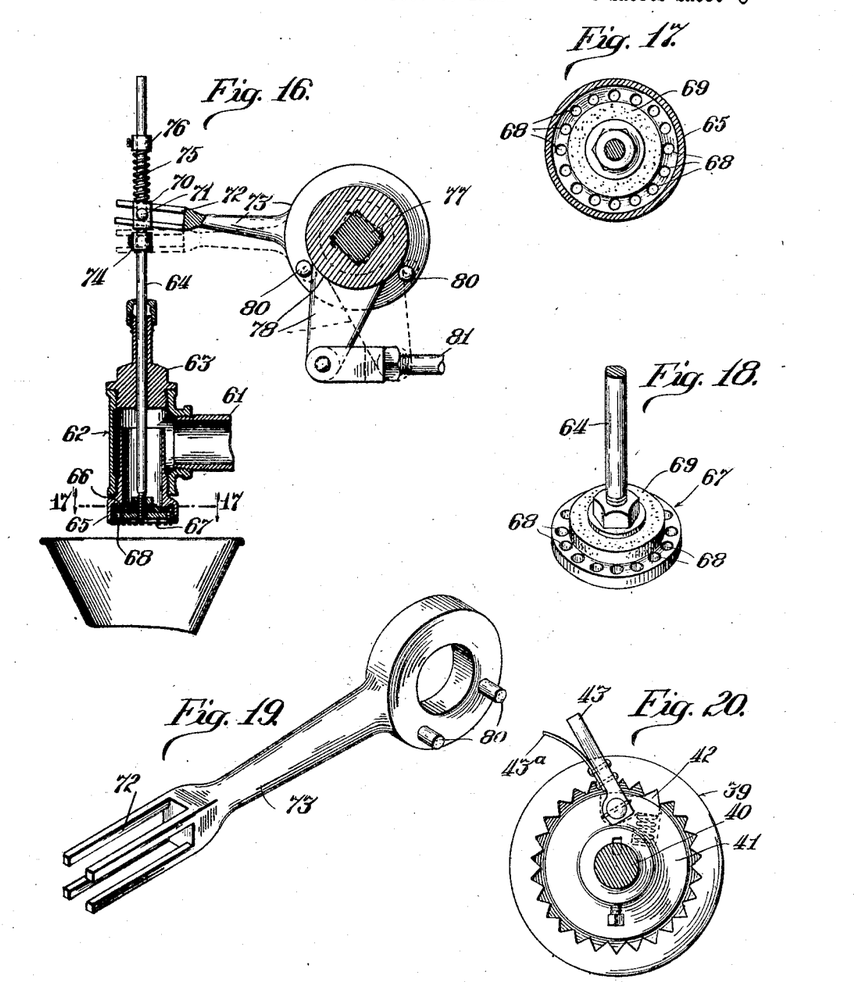
Figure 16 is a sectional view taken substantially on the line 16—16 of Figure 6 looking in the direction of the arrows.
Figure 17 is a detail sectional view taken on the line 17—17 of Figure 16 looking downwardly.
Figure 18 is a detail view in perspective of the valve member disclosed in Figures 16 and 17.
Figure 19 is a detail view in perspective of the valve-operating member.
Figure 20 is a detail view of power-imparting or coupling mechanism intermediate of the power-imparting shaft and the driven shaft.

The conduit 61 leads to a shell or casing 62, see Figure 5, which is preferably of the construction more clearly shown in Figure 16. The shell or casing 62 is provided at its top with a suitable cap 63 apertured to provide a passage and guide for a rod 64 and also formed to provide a gland for suitable packing whereby a fluid-tight slidable relation with the rod 64 may be provided. The lower end of the shell or casing 62 is shown internally threaded to receive a valve-seat member 65 which is perferably formed with an internal shoulder or seat at 66 for a valve 67 which is secured to the lower end of the rod 64. The valve 67 is perferably in the nature of a disc provided with a plurality of circumferentially disposed apertures as at 68, see Figure 17, arranged adjacent the periphery of the disc, while the intermediate or central portion is preferably provided with a washer 69 adapted to form fluid-tight relation with the shoulder or seat 66 when the valve is in closed position.

The upper end of the rod 64 is shown provided with a sleeve 70 having oppositely disposed trunnions at 71 to be engaged by the bifurcated end 72 of the valve-actuating member 73. The sleeve 70 is slidably mounted on the rod 64 and its degree of movement on the rod is determined by a collar 74 which is held in its adjusted position by a set-screw. The upper end of the sleeve 70 has the end of a coil spring 75 seated thereon, with the opposite end of the spring abutting against a collar 76 on the rod 64; the collar 76 being also adjustable so that the tension of spring 75 may be regulated so as to compensate for slight differences in movement of the actuating member 73 and the valve and at the same time provide a yielding relation between them which also ensures holding the valve to its seat.

The valve 54 is provided with a trunnion 77 at one end; the trunnion being preferably made angular in cross section to receive the apertured end of a link 78, which is adapted to transmit movement of the valve 54 when the link is oscillated. The link 78 is adapted to extend between a pair of pins 80, 80, arranged at predetermined points and spaced apart, (a distance somewhat greater than the width of link 78) on the hub portion of the valve-actuating member 73, (see Figures 16 and 19); the latter being loosely mounted on the hub portion of link 78. It is evident therefore that as the link 78 is oscillated to rotate valve 54, member 73 will be oscillated, in a vertical direction after link 78 approaches opposite ends of its stroke and therefore momentarily subsequent to the actuation of the valve 54; vertical oscillation of member 73 causing the actuation of the valve-rod 64, with the result that the valve 67 will be moved off its seat whenever the link 78 has almost completed its oscillation to the left in Figure 5, or to the right in Figure 16, at which time valve 54 will have been rotated into a position where the dished-out portion 55 will register with the port 58 of the fluid receptacle 59 and with port 57 communicating with the cylinder 52, namely the position shown in Figure 7. With the valve 54 in the position shown in Figure 7, the contents of the receptacle 59 will be permitted to flow into the cylinder 52.

Figure 6:
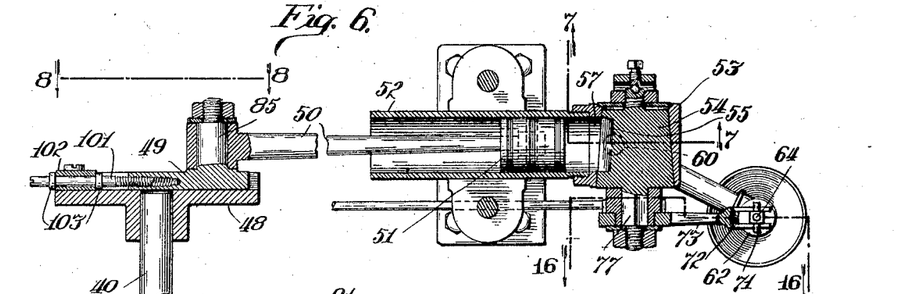
Figure 6 is a longitudinal sectional view taken on the line 6—6 of Figure 5 looking in the direction of the arrows.

The operation of the valve 54 is induced by means of the link 78 to which is secured a rod 81 whose opposite end is pivotally secured to an oscillatingly mounted lever 82. The lever 82 is pivoted at 83 on a suitable support or bracket on the top or bed-plate 84 of the machine; the lever 82 being disposed upwardly and in juxtaposition to the disc 48, namely on the side of the disc opposite to that which is provided with the wrist-pin 85 to which the piston rod 50 is pivotally connected. The bracket to which the lever 82 is pivotally secured is also provided with a second lever 86 pivotally mounted and upwardly disposed adjacent to the disc 48 and on the opposite side of its axis. The two levers 82 and 86 are connected together by suitable connecting means as at 87 see Figure 5, so that oscillation of one lever will cause similar oscillation of the other lever and in the same direction. Secured to the adjacent side of the disc 48 and preferably in proximity to the periphery thereof, I provide a striker element 88, preferably in the nature of a roller, which is adapted to engage with the upper ends of the levers 82 and 86 when disc 48 is rotated. The upper end of lever 82 is bent toward the disc 48 and at a predetermined angle to provide the roller engaging face 89, sloping downwardly in the direction of the cylinder 52; while the upper end of lever 86 is tapered on its forward side toward the end to provide the sloping face 90, of a somewhat less angle than the angularity of the surface 89 of lever 82. These sloping or beveled surfaces 89 and 90 are disposed in the path of the striker element or roller 88 and are of such inclination or bevel that the striker 88 may ride downwardly over the bevel surface 90 of lever 86 and upwardly over the inclined surface 89 of lever 82, and cause the levers 82 and 86 to be oscillated vertically about their respective pivotal points. As striker 88 rides downwardly over the surface 90 of lever 86, the lever will oscillate to the left in Figure 5 and cause similar oscillation of lever 82, moving the upper angular end thereof into the path of the striker 88, so that continued rotation of disc 48 will cause the striker 88 to engage with the under side of the bent sloping end 89 and force lever 82 to the right in Figure 5, at the same time inducing similar oscillation of lever 86 so that it will be in position to be engaged by striker 88 in the further rotation of the disc 48. It is apparent that the rotation of disc 48 in counter-clockwise direction in Figure 5 will force lever 82 into the position shown in said figure, which causes the valve 54, by means of link 78 and rod 81, to be also rotated in counter-clockwise direction, namely into the position shown in Figures 6 and 7, where the liquid is allowed to flow from the receptacle 59 through the dished-out portion 55 in valve 54 and into cylinder 52.

The connection of the piston-rod 50 and the positioning of the block 49 on the opposite side of disc 48 are such that when the striker 88 is in the position just described and as shown in Figure 5, the piston 51 will begin reciprocation in a direction away from the valve-end of the cylinder, namely begin the suction or intake stroke. With this relation of the piston operating mechanism to the striker 88, it is apparent that when the striker 88 engages the sloping surface 90 of lever 86, the valve 54 will be oscillated in clockwise direction in Figure 7 a distance sufficient to bring the dished portion 56 into register with the port 57 of cylinder 52 and the port 60 of the conduit 61, at which time the piston 51 will be forced toward the valve end of the cylinder, thereby forcing the liquid from the cylinder through the dished-out portion 56 and into conduit 61. The liquid from the conduit 61 enters the shell or casing 62 above the valve 67 thereof. During the rotation of valve 54 into the position shown in Figure 7, namely the position induced by striker 88 passing from the sloping surface 89 of lever 82, the member 73 will be oscillated upwardly in Figure 5, moving the sleeve 70 on rod 64 upwardly against the action of spring 75, causing the valve 67 to be firmly held on its seat at the bottom of the shell or casing 62. The oscillation of lever 86, by reason of the connections through connecting member 87 with lever 82, causes rod 81 to oscillate link 78 in clockwise direction, thereby inducing member 73 to oscillate downwardly. Such movement of member 73 forces rod 64 downwardly and moves the valve 67 off its seat sufficiently to permit the liquid to pass beneath the seat 66 and discharge through the ports 68 in disc-valve 67; the discharge being mainly through said ports because the valve 67 is in close relation with the side walls of tubular member or extension 65. The end 72 of member 73 is bifurcated or slotted vertically and horizontally, both for the trunnions 71 of sleeve 70 and for the stem 64, to a considerable extent to permit member 73 to swing through the arc of a circle without interfering with the vertical reciprocation of rod 64, while slight additional movement of the member 73 is permitted after the valve 67 has been forced to its seat.

The fluid-holding receptacle 59 may be of any suitable size and construction, being preferably provided with a tapered or cone-shaped bottom as shown in Figures 1 and 7, with the apex or bottom end thereof provided with a coupling whereby the receptacle may be secured to the valve-casing 53. In order that the fluid in the receptacle 59 may be kept in desired condition, namely to prevent a precipitation of any of the ingredients, I provide the receptacle 59 with a vertically disposed shaft 91 rotatably mounted at its bottom end in a suitable spider or bracket as at 92, see Figure 7, and this shaft 91 is provided with a pair of agitators or blades 93, 93, the one arranged above the spider or bracket while the other is secured to the end of the shaft immediately beneath the bracket or spider; the blades being adapted to rotate with the shaft 91. These blades are of a construction to permit free rotation as near the bottom of the receptacle 59 as possible and any suitable number of blades or agitators may be employed to maintain proper agitation of the liquid to prevent the accumulation of precipitant or sediment at the bottom of the receptacle, thus ensuring the matter discharging through valve 54 to be of like consistency. The upper end of the shaft 91 is provided with a bevel gear 94 arranged in mesh with a bevel pinion 95 secured to the transversely disposed shaft 96 arranged in suitable brackets 97 secured to opposite sides and on top of the receptacle 59, see Figures 1 and 3. The outer end of shaft 96 is shown provided with a sprocket wheel at 98 about which a suitable chain 99 is disposed; said chain being also disposed about a suitable sprocket arranged on the end of the shaft on which worm-gear 35, of the transmission mechanism, is mounted, so that the agitator will be kept in constant rotation as long as the machine is in operation. The receptacle 59 is preferably provided with a sectional cover or top as at 100 in Figure 1, hinged or otherwise secured at points adjacent to the transverse or longitudinal center of the top of the receptacle 59. The throw or reciprocation of piston 50, as previously stated, is controlled by the positioning of the block 49 relative to the axis of disc 48 and this position may be adjusted by means of the threaded rod 101 which is disposed through a stationary block 102 secured in the transverse groove of disc 48, while the inner end of rod 101 is threaded into a tapped opening in slidable block 49; the position of the rod being maintained by jam nuts as at 103 which are screwed into snug relation with opposite sides of the stationary block 102; the slidable block 49 being shown fitting into the dove-tailed groove in the disc 48 which will hold the block firmly in place.

Figures 12, 13, 14, 15:
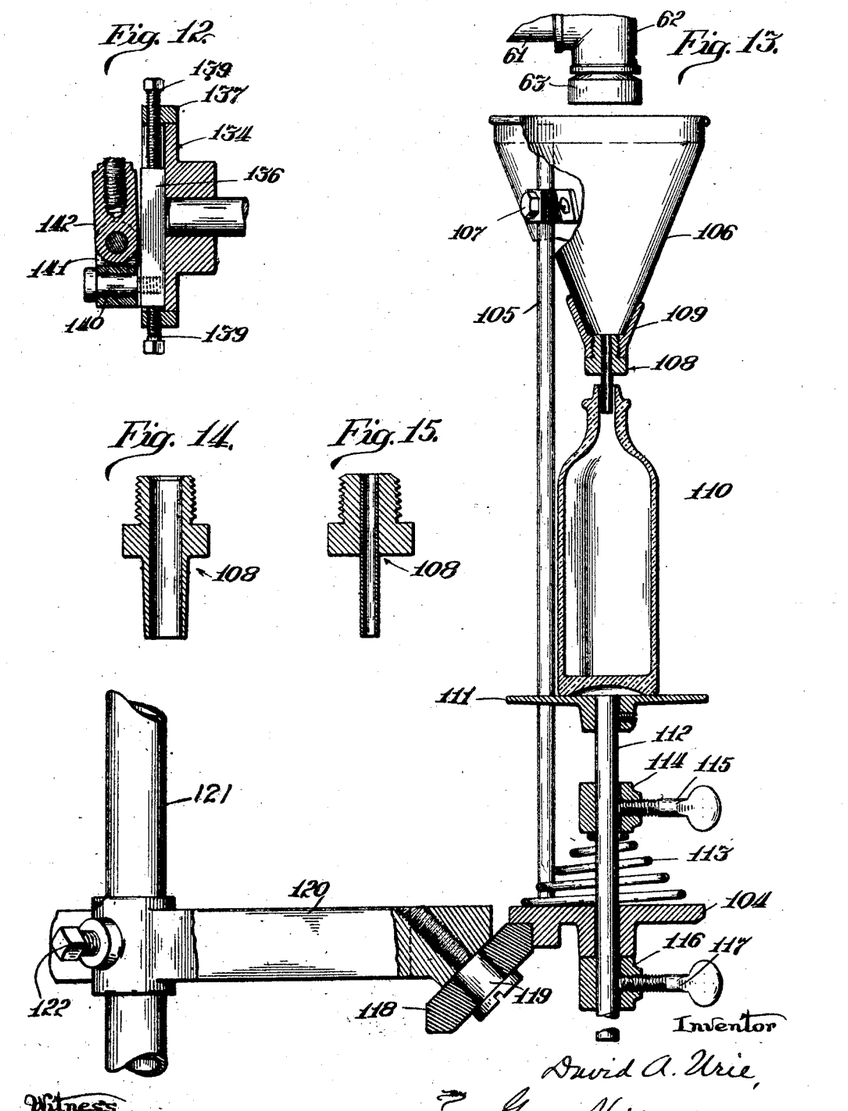
Figure 12 is a detail sectional view taken on the line 12—12 of Figure 10 looking in the direction of the arrows.
Figure 13 is a detail view, in section, of a portion of the receptacle carrier mechanism and filler element.
Figure 14 is a detail view in section of a filler nozzle.
Figure 15 is a detail view in section of another form of filler nozzle.

Disposed circumferentially about the supporting legs of the machine is a ring 104 see Figures 1 and 13 and this ring 104, at suitable spaced intervals apart, is provided with a number of upwardly disposed rods or supporting members 105, adapted to extend a sufficient distance above the ring 104 for the purpose of supporting the funnel members 106. The funnel members are shown provided with a socketed lobe or ear to receive the supporting member 105 and are also provided with a clamping bolt or screw 107 whereby the vertical position of the funnel member 106, on the supporting member 105, may be regulated and maintained. The members 106 are preferably of the funnel formation to receive all liquid discharged by the valve 67 and in order to discharge the same into the bottles or small orificed containers, I provide each member 106 with a nipple 108 which is screwed into a tapped opening formed in the shell 109 at the lower end of the funnel member 106; the nipple being preferably in the nature of a tube as shown in Figure 13 and of suitable diameter to permit it to enter the rather small orifice of a bottle indicated at 110 in Figure 13.

The bottle or other container to be filled is placed on a holding member or tray 111 secured to the upper end of a post 112 which is disposed through a suitable opening in the ring 104; it being understood that a separate bottle-holding member or tray 111 is provided for each funnel member 106 and arranged immediately beneath the discharge or nipple end thereof. The post 112 is slidable through the ring 104 and is controlled by means of the conical spring 113 seated on member 104, while the upper end of the spring is in engagement with a collar 114 on post 112; the collar 114 being adjustable on the post and held in place by the thumb-screw 115. With this construction, it is apparent that the bottle-holding tray 111 will be maintained in elevated position through the action of the spring 113; and in order to prevent the too far upward movement of the tray 111 or to adjust it, relative to the nipple 108 of funnel member 106 for varying sized bottles, I provide the post 112 at a point beneath the ring 104 with a second collar 116 adjustable on the post and clamped thereto by means of the thumb-screw 117. With this construction, it is apparent that the tray or bottle-holding member 111 may be arranged in different horizontal planes and its normal position, relative to the nipple 108, regulated. The bottle-holding disc or tray is normally positioned at a distance from the end of nipple 108 somewhat less than the height of the bottle to be filled, in order that the bottle, when placed on the tray or disc 111, will have the end of the nipple 108 extend into the neck of the bottle and prevent possibility of the bottle upsetting or becoming shifted in its position.

As previously stated, the machine is provided with a rotating table or ring 104 of such circumference as will adapt it to a multiple of bottle-holding trays or discs and a corresponding number of nippled funnel members in order that a continuous operation of bottle or receptacle filling may be provided.

Figure 9:
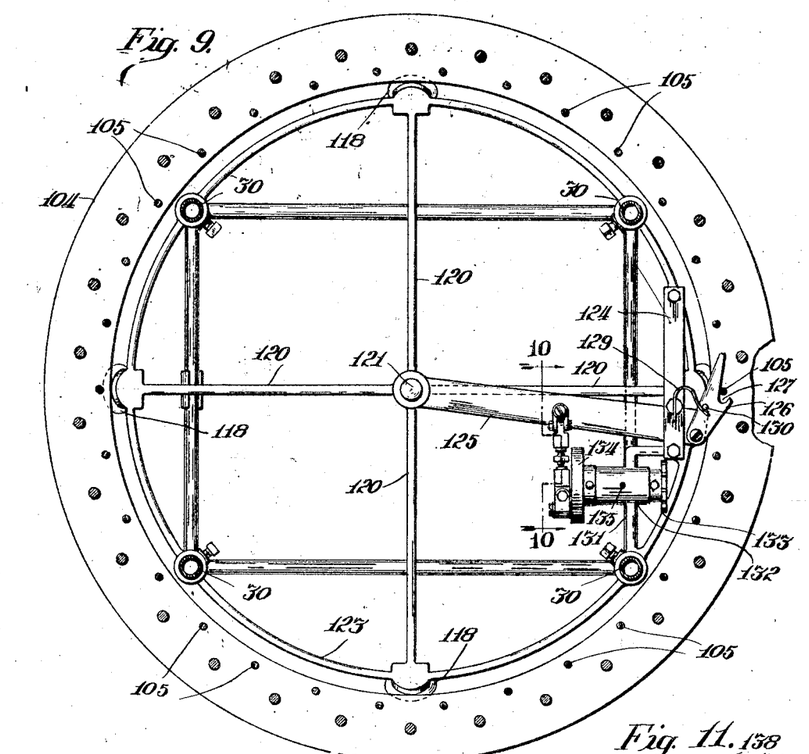
Figure 9 is a cross sectional view taken on the line 9—9 of Figure 1 looking in the direction of the arrows.

The table or annular member 104 is rotatably supported on a suitable number of bevelled rollers 118 secured on trunnions 119 arranged at an angle in the ends of spokes or arms 120 radiating from a center post or supporting member 121, see Figures 9 and 13; the spokes or spider 120 being adjustably secured on the center post or member 121 by means of the clamp-bolt 122 as shown in Figure 13. The under side of the table or annular member 104, adjacent to the inner perimeter thereof, is formed to provide an angular groove corresponding with the cross-sectional configuration of the double bevelled surface of the rollers 118, see Figure 13.

The supporting frame of the machine also comprises an annular member or ring 123 on which is secured a plate or bar 124; the plate being arranged in a higher horizontal plane to provide space therebeneath for the passage of an oscillatingly mounted lever 125; the lever 125 being shown pivoted on the center post 121 with its free end supported by the annular member or ring 123, see Figure 9.

Figure 10:
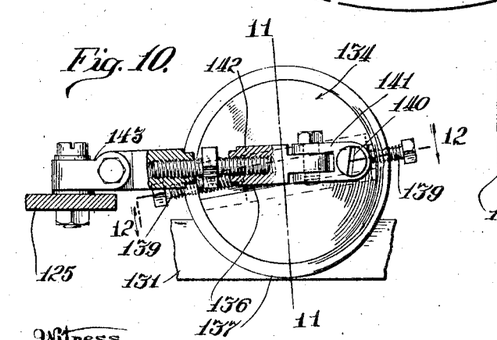
Figure 10 is a detail sectional view taken on the line 10—10 of Figure 9 as indicated.
Figure 11:
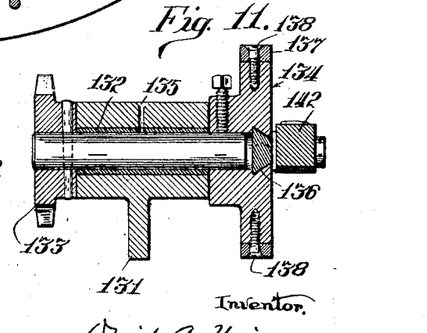
Figure 11 is a detail sectional view taken on the line 11—11 of Figure 10.

The outer end of lever 125 is provided with a pawl 126 pivotally secured thereto. The free end of the pawl 126 is preferably partially cut away or reduced and socketed or notched at an intermediate point as shown at 127 to engage with the rods 105 which are arranged circumferentially about the top surface of plate 104 and spaced suitable distances apart so as to be disposed at points intermediate of the posts 112 and adjacent to the inner periphery of the ring 104. The pawl 126 is forced toward the rods 105 by a spring 129 which is secured to the plate 124 while the free end of the spring presses against a pin 130 on the pawl 126 at an intermediate point. The frame is also provided with a bracket 131 which is formed to provide a bearing for a journal 132, to one end whereof is secured a sprocket wheel 133, while the other end is provided with a disc 134; the bearing portion of bracket 131 being shown provided with a suitable oil-receiving hole 135 whereby journal 132 may be lubricated. The disc 134 is preferably provided with a transversely disposed groove into which a block 136 is dove-tailed to permit of adjustment lengthwise of the groove; the disc 134 being shown provided with a band 137 disposed about the periphery and secured in place by bolts or screws as at 138, see Figure 11. The position of block 136 is controlled by adjusting bolts 139 which screw through the ring or band 137 and engage with opposite ends of the block 136, see Figure 12. The block 136, adjacent one end, is shown provided with a wrist-pin 140 which is provided with a bifurcated link 141 (see Figure 10) to which one end of a turn-buckle 142 is pivotally secured, while the other end of the turn-buckle 142 is pivotally secured to a link 143 which, in turn, is pivotally secured to the lever 125, see Figure 9. The sprocket-wheel 133 is adapted to receive a sprocket chain 144 which leads from a sprocket-wheel 145 secured to the end of sleeve 38 of the transmission mechanism 34, see Figures 1, 3 and 4.

As is apparent from the construction shown, the journal 132 will be rotated when the transmission mechanism 34 is in operation, thus causing disc 134 to be rotated. With the wrist-pin carrying block 136 positioned toward one end of the groove in the disc 134, namely with the wrist-pin 140 eccentric to the axis of the disc 134, it is evident that the turn-buckle connection between wrist-pin 140 and the lever 125 will cause the latter to oscillate horizontally; the degree of oscillation being controlled by the position of the wrist-pin 140 relative to the axis of the disc 134; the adjustment of the wrist-pin being such that lever 125 will be oscillated sufficiently to cause pawl 126 to rotate ring 104 a degree substantially corresponding with the distance between the posts 112. Such movement of the ring 104, will cause a succeeding funnel member 106 and its respective bottle or container to be shifted beneath the discharge member 62. Continued rotation of the journal 132 with its disc 134 will cause oscillation of the lever 125 back to normal position, whereby pawl 126 will be allowed to slide past the rod 105 engaged thereby and to engage with the next succeeding rod 105; namely into the position shown in Figure 9 where the pawl is at the end of its return stroke and prepared to engage the rod 105 to rotate the ring 104 a predetermined degree upon the outward stroke or oscillation of lever 125; the ring being rotated merely during such outward stroke of the lever 125.

With the turn-buckle pivotally connected to the wrist-pin 140 and to the lever 125 as shown and described, it is apparent that a universal connection is provided, which permits the one end to move through a vertically disposed arc and the turn-buckle connection to also have lateral play during its reciprocatory strokes. The length of the reciprocatory stroke of lever 125 will be controlled by the positioning of the wrist-pin block 136, while the adjustment of the moment of starting and stopping of lever 125 in its reciprocation and therefore the positioning of the funnel members 106 and the containers on the holding-trays 111, to a nicety may be controlled by proper turning or adjusting of the turn-buckle 142.

It is also apparent that any wear of valve 67 and its seat 66 may be taken care of by changing the tension of spring 75, which ensures complete seating of the valve and maintaining it on its seat; while the spacing of pins 80, 80 to be engaged by lever 78 will also compensate for differences, within given range, in the stroke and length of the lever.

In order that the desired operation of the filling portion of the machine may be maintained without necessitating the foot of the operator to remain on the foot-lever 79, I provide the frame or supports of the machine with a plate 146 which is shown clamped in place and provided with a bayonet-slot 147, so that when the foot-lever 79 is pressed downwardly to the end of slot 147 it may also be moved slightly to one side and be held in the off-set or lower end of the slot 47. This depressed position of the foot-lever 79 causes bell-crank lever 44 to move roller 45 into the path of the composite striker 43—43ª, which immediately forces pawl 42 out of engagement with the teeth of disc 39, at which time shaft 40 will be uncoupled from sleeve 38; pawl 42 establishing operative relation between shaft 40 and sleeve 38 as soon as striker 43—43ª passes beyond roller 45, at which time shaft 40 will revolve at the same speed at which sleeve 38 is being rotated by the variable speed transmission gearing previously described.

I have described my improved receptacle filling machine in its specific embodiment as disclosed in the drawings, a machine which is adapted to accurately control the quantity discharged and conveyed into the containers; having described the same in terms which have been employed merely as terms of description and not as terms of limitation, because structural modifications are possible and may be made without, however, departing from the spirit of my invention.

What I claim is:—

1. In a machine of the character described, a ring circumferentially disposed about the machine and mounted to rotate thereabout, a plurality of tray-holding rods disposed through said ring, stop elements adjustably secured to said rods above and below the ring, springs intermediate of the ring and the upper stops whereby the trays are yieldingly held above the ring, a plurality of fluid-conveying elements carried by said ring to rotate therewith and arranged in vertical alignment above and in spaced relation with the trays, and means whereby said ring with its trays and fluid conveying elements may be intermittently rotated a degree corresponding with the distance intermediate of the centers of the fluid conveying elements.

2. In a machine of the character described, a rotatably mounted ring encircling the machine, bottle-holding trays yieldingly arranged on the ring in predetermined spaced relation and provided with stems disposed through the ring, resilient means whereby the trays are yieldingly held in elevated position above the ring, adjustable means secured to said stems whereby the extent of vertical movement of the trays is controlled, a plurality of fluid-conveying elements carried by the ring in a plane above the trays and in vertical alignment therewith, said elements being provided with removable discharge nipples adapted to enter the orifice of the bottles, and an oscillatable member having yielding operative relation with said ring whereby the latter is given a predetermined degree of rotation during one stroke of said oscillatable member.

3. In a machine of the character described, a spider, the arms whereof are provided at their ends with rollers having angular surfaces arranged at an outwardly disposed inclination, a ring disposed about the machine provided on its inner perimeter with an angular groove corresponding with the angular surfaces of the rollers of the spider, a plurality of trays carried by the table, means whereby the normal position of the trays relative to the ring may be regulated, said means being adapted to yieldingly support the trays in place, a plurality of vertically disposed rods mounted on said ring, funnel members adjustably secured to the rods in a plane above and in vertical alignment with said trays and provided with removable discharge nipples, oscillating means, having yielding operative relation with the ring, adapted to rotate the ring to a predetermined extent during one stroke of oscillation of said means, and power-imparting mechanism whereby said oscillating means is actuated.

4. In a machine of the character described, a ring encircling the machine, a plurality of vertically adjustable rods mounted on the ring, trays mounted on said rods, a coil-spring disposed about each rod and seatable on the ring, adjustable means for regulating the spring pressure, regulable means on said rods beneath the ring for limiting the upward movement of the rods, a second set of rods mounted on the ring, a fluid-conveying member adjustably secured to each of the last mentioned rods in a plane above and in vertical alignment with said trays, an oscillatingly mounted lever secured to the frame of the machine within the ring, a spring-controlled pawl pivoted on said lever whereby the table may be rotated a predetermined extent during movement of the pawl in one direction, and means for oscillating said lever.

5. In a machine of the character described, a receptacle carrying ring encircling the machine and rotatable thereon, a lever pivoted to the machine frame and provided at its end with a spring pressed pawl, the latter being adapted to have operative relation with said ring so as to actuate the latter when the lever oscillates in one direction, a power operated disk provided with an adjustable wrist pin, and pivoted means intermediate of the wrist-pin and said lever.

6. In a machine of the character described, provided with motive power, a rotatably mounted ring having mounted thereon a plurality of fluid-directing elements disposed in elevated relation therewith and a plurality of vertically adjustable container-holding elements correlated to the first mentioned elements, a lever pivoted to the frame within said ring, a spring controlled pawl pivoted on said lever and adapted to have operative relation with the ring, rotating means intermediate of the motive power and the lever, and means intermediate of the lever and the rotating means and having eccentric relation with the latter whereby the ring will be rotated a predetermined extent during each operation of said rotating means.

7. In a machine of the character described, a ring disposed about the machine and rotatable thereon, said ring being provided with a plurality of yielding bottle holding trays, a lever pivoted to the frame of the machine within the ring so as to swing laterally, a spring pressed pawl pivoted on the end of the lever and adapted to have operative engagement with the ring, power operated rotating means provided with an adjustable wrist-pin, and extensible flexible means intermediate of the wrist-pin and said lever.

8. In a machine of the character described, a rotatable container holding table, a rotatable disc provided with an adjustable wrist-pin, oscillatable means for controlling said table, and means for providing adjustable connection between the wrist-pin and said oscillatable means whereby to control the oscillatory periods of said oscillatable means.

9. In a machine of the character described, a container holding table disposed circumferentially about the machine, a power-imparting disc provided with an adjustable wrist-pin, oscillatably mounted means for controlling the movement of the table, and a turn-buckle connection intermediate of said wrist-pin and said oscillatably mounted means, provided at each end with a vertical and horizontal swivel-joint adapted to provide a universal connection between the wrist-pin and said means.

10. A machine of the character described, comprising a supporting frame, a spider adjustably secured to said frame against rotation, the outer ends of the spider being provided with beveled rollers arranged at an outward inclination, a container-holding table comprising a ring disposed about the frame and kerfed on its lower surface at the inner perimeter thereof, the kerf being adapted to receive the rollers whereby the ring is supported in place, fluid receiving funnels adjustably mounted on and in spaced relation with said ring, adjustable container holding trays carried by said ring in predetermined spaced relation with said funnels, the funnels and trays being arranged in vertical alignment and movable with the table, and means for yieldingly holding the trays in their adjusted position.

11. In a machine of the character described, a supporting frame, a spider secured to said frame and provided with rollers, an annular member carried by said rollers, fluid directing members mounted on said annular member in spaced relation therewith, container holding trays adjustably secured on said annular member beneath said fluid directing members, an oscillatable arm secured to said frame and provided with a spring controlled pawl adapted to have operative relation with said annular member to rotate the latter when said arm is oscillated in one direction, and regulable means whereby the degree of oscillation may be determined.

12. In a machine of the character described, a supporting frame, a spider secured to the frame and provided with rollers, a flanged ring mounted on said rollers and provided with a plurality of upwardly disposed rods, fluid-directing members secured to the rods in spaced relation with the ring, container holding trays yieldingly secured on the ring beneath said members, an oscillatable arm secured to the supporting frame and provided with a spring controlled pawl adapted to engage with said rods, whereby the ring is rotated when said arm oscillates in one direction, rotatable means secured to the frame, and regulable means intermediate of said rotatable means and said arm whereby the degree of oscillation of the arm is determined.

13. In a machine of the character described, a supporting frame, a ring rotatably disposed about said frame, fluid directing elements mounted on the ring in spaced relation therewith, container holding trays yieldingly mounted on the ring beneath the elements, means whereby the ring is given intermittent movement, rotatable driving means provided with an adjustable wrist pin, and adjustable means pivotally secured to the wrist pin and to said first means whereby the degree of movement of the ring may be regulated.

14. In a machine of the character described, a supporting frame, a ring rotatably secured thereon, fluid directing elements carried by said ring, container holding trays adjustably secured to said ring and beneath said elements, an oscillatable arm provided with a spring controlled pawl adapted to have operative relation with the ring to cause intermittent movement of the latter when the arm moves in one direction, a power imparting disk provided with an adjustable wrist pin, and a link pivotally secured to the wrist pin and to said arm whereby the latter is oscillated, the pivotal connections of the link comprising a vertical pivot and a horizontal pivot at each end of the link.

DAVID A. URIE.